United States Patent
Honma

(10) Patent No.: US 6,876,389 B1
(45) Date of Patent: Apr. 5, 2005

(54) OUTPUT CONTROL METHOD AND APPARATUS, AND STORAGE MEDIUM

(75) Inventor: Hideo Honma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 09/678,253

(22) Filed: Oct. 3, 2000

(30) Foreign Application Priority Data

Oct. 6, 1999 (JP) ............................................ 11-285941

(51) Int. Cl.$^7$ ............................................ H04N 5/222
(52) U.S. Cl. ............................. 348/333.12; 348/231.99
(58) Field of Search ........................ 348/333.01–333.12, 348/231.99, 207.2, 555, 558, 445, 556, 913, 333.05; 345/239, 619, 625, 668, 838; 671/671, 797; 355/36; 382/298; 396/436

(56) References Cited

U.S. PATENT DOCUMENTS

| | | | | |
|---|---|---|---|---|
| 5,973,734 A | * | 10/1999 | Anderson | .................. 348/239 |
| 6,266,126 B1 | * | 7/2001 | Haneda | ........................ 355/36 |
| 6,545,708 B1 | * | 4/2003 | Tamayama et al. | ....... 348/211.8 |
| 2001/0052931 A1 | * | 12/2001 | Suzuki et al. | .................. 348/96 |
| 2002/0000998 A1 | * | 1/2002 | Scott et al. | ................. 345/667 |
| 2002/0135621 A1 | * | 9/2002 | Angiulo et al. | ............. 345/838 |

* cited by examiner

*Primary Examiner*—Tuan Ho
*Assistant Examiner*—Yogesh Aggarwal
(74) *Attorney, Agent, or Firm*—Fitzpatrick, Cella, Harper & Scinto

(57) ABSTRACT

An output control method and an apparatus are provided, by which even in the case where aspect ratios of a thumbnail image and a main image are different, an image with the aspect ratio of the main image can properly be displayed. The apparatus has a TV display control part for displaying image data imaged by a digital camera on a TV, and the TV display control part compares aspect ratios of a thumbnail image and a main image in the image data, and performs control so that the thumbnail image is used as display data to be displayed on the TV when they are the same, and that the main image is used as the display data when they are different.

40 Claims, 2 Drawing Sheets

OUTPUT CONTROL METHOD AND APPARATUS, AND STORAGE MEDIUM

BACKGROUND OF THE INVENTION

The present invention relates to an output control method and an apparatus for controlling output of image data imaged, for example, by a digital camera, and a storage medium in which a control program for controlling this output control apparatus is stored.

Generally, a television image may have a resolution lower than that of a printed image, but it must be displayed at a higher speed. Image data imaged by a digital camera (digital camera data) has a thumbnail image for such an application, and in some cases, this thumbnail image is used as display data to be displayed on a television receiver. That is, a piece of image information includes main image data having an original resolution and data of a thumbnail image that is a thinned image thereof, and mainly, the former is used as data to be printed and the latter is used as data to be displayed on a television receiver or the like.

In the above described thumbnail image, aspect ratios are generally specified in a standard. However, the aspect ratio of the above described main image is not specified. In the case where the aspect ratios of the above described main image and the above described thumbnail image are different, for example, in the case where a wide image is imaged, as shown in FIG. 3, an image in which a thinned image 302 of a main image is arranged in an external shape 301 with a specified aspect ratio is formed as a thumbnail image. Between the external shape 301 with the specified aspect ratio and the thinned image 302 of the main image, a black data (black frame) is put.

In the case where such a thumbnail image is used as data to be displayed on a television receiver or the like, when the whole of the thumbnail image is displayed as it is, there has been such a problem that the display image is not difficult to see since it is displayed together with the above described black data (black frame).

The present invention is made in view of such a problem included in the above described prior art, and it is an object of this invention to provide an output control method and an apparatus in which, when outputting image data on the display on a television receiver or the like, even in the case where the aspect ratios of a thumbnail image and a main image are different, an image with the aspect ratio of the above described main image can properly be output on the display.

SUMMARY OF THE INVENTION

One embodiment of the present invention provides an output control method for controlling output of image data imaged by image pick up means, comprising a display control step of displaying the above described image data on display means, wherein the above described display control step compares the aspect ratios of a thumbnail image and a main image in the above described image data, and it performs the control so that the above described thumbnail image is used as display data to be displayed on the above described display means when they are the same, and that the above described main image is used as the above described display data when they are different.

DESCRIPTION OF THE PREFERRED EMBODIMENTS

Figure 1:
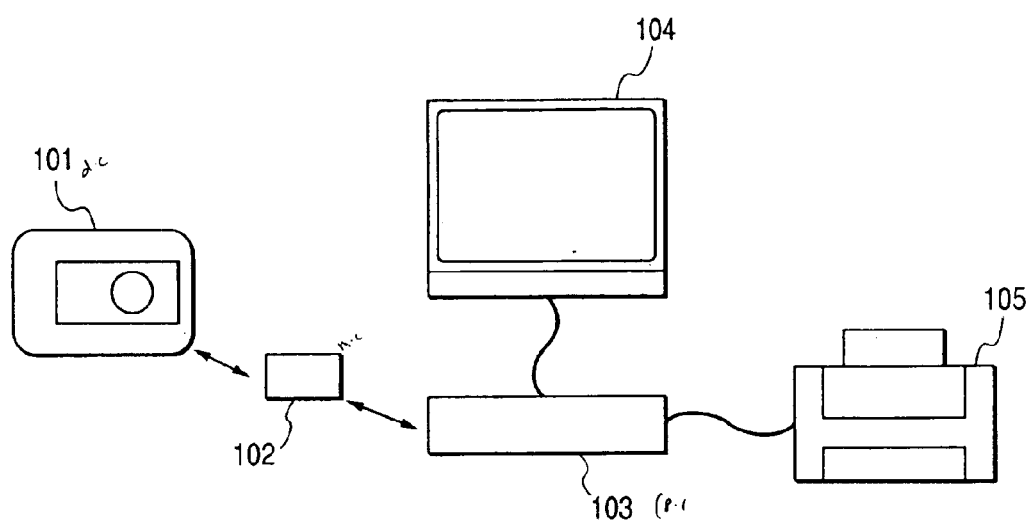
FIG. 1 is a block diagram showing the configuration of a printer system having an output control apparatus (printer controller) according to one embodiment of the present invention.
Figure 3:
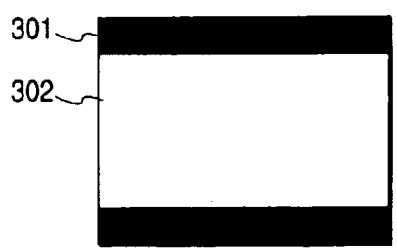
FIG. 3 is a conceptual diagram of a thumbnail image.

One embodiment of the present invention will be described below by referring to the drawings.

FIG. 1 is a block diagram showing the configuration of a printer system having an output control apparatus (printer controller) according to the present embodiment.

In the above described figure, reference numeral 101 denotes a digital camera that is image pick-up means, and reference numeral 102 denotes a memory card, which keeps image data imaged by the digital camera 101 and can be removably attached to the above described digital camera 101. Reference numeral 103 denotes a printer controller that is an output control apparatus of the present invention, which reads in the image data kept in the memory card 102 and controls the output of the read-in image data. Reference numeral 104 denotes a television receiver (TV) as display means, which is made of a Cathode Ray Tube: CRT, a Liquid Crystal Display: LCD or the like, and is connected to the printer controller 103 to be controlled by the above described printer controller 103, and outputs the image data on the display. Reference numeral 105 denotes a printer, which is connected to the printer controller 103, and is controlled by the above described printer controller 103 to output the image data on the printer.

The printer controller 103 has a slot into which the memory card 102 is inserted, and it displays the image data kept in the memory card 102 on the television receiver 104 according to the operation of a user, and in the meantime, it performs a control function so that the image data is output on the printer 105. The image data from the digital camera 101 conforms to a standard such as DCF, CIFF, Exif, and on the basis of the specifications thereof, the printer controller 103 performs analysis and processing.

Figure 2:
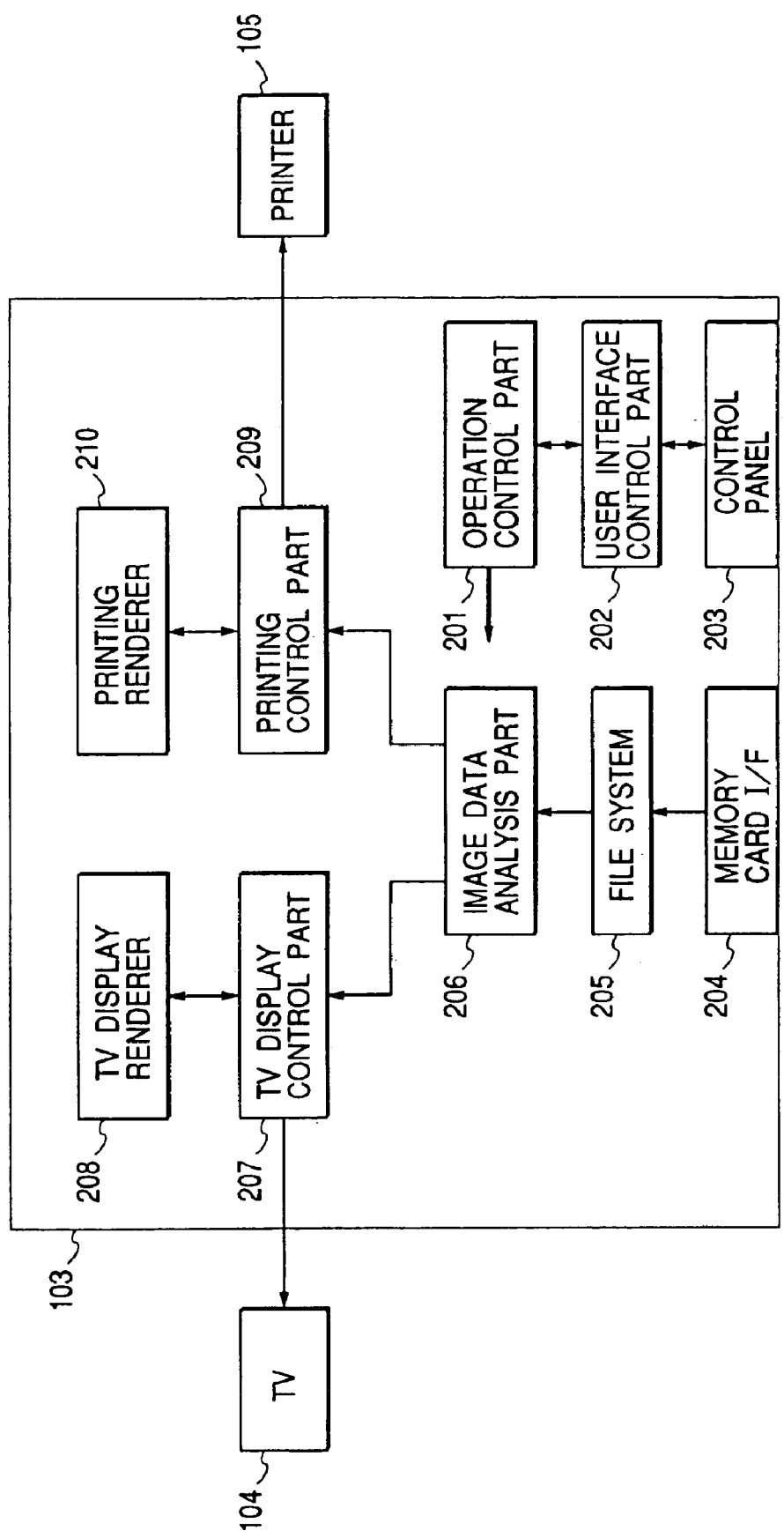
FIG. 2 is a block diagram showing the functional configuration of the output control apparatus according to one embodiment of the present invention.

FIG. 2 is a block diagram showing an example of the functional configuration of the printer controller 103.

As shown in the above described figure, the printer controller 103 includes an operation control part 201, a user interface control part 202, a control panel 203, a memory card I/F (interface) 204, a file system 205, image data analysis part 206, a TV display control part 207, a TV display renderer 208, a printing control part 209, and a printing renderer 210.

The TV display control part 207 is connected to the TV 104, and the printing control part 209 is connected to the printer 105.

Now, the operation of the printer controller 103 with the above described configuration will be described.

The operation control part 201 performs the integrated control according to the operation of the user through the user interface control part 202 and the control panel 203. The user inserts a memory card 102 into the slot, and the image data analysis part 206 analyzes the image data through the memory card I/F 204 and the file system 205.

Then, in the case where the TV display is performed, the TV display control part 207 reads in display image data from the image data analysis part 206, and renders the display image data by the TV display renderer 208, and outputs it to the TV 104.

Furthermore, in the case where printing is performed, the printing control part 209 reads in printing image data from the image data analysis part 206, and forms the printing image data by the printing renderer 210, and outputs it to the printer 105.

Now, the formation method of a display image data that is the essential point of the present invention will be described. First, the information on the aspect ratios of a thumbnail image and a main image is obtained from the image data analysis part 206, and these are compared with each other. Then, when they are the same, the thumbnail image is used as the display image data as it is, and when they are different, one of the following methods (1) to (3) is selected and performed:

(1) The main image is used as the display image data.

(2) The thumbnail image is subjected to a clipping process to have the aspect ratio of the main image. This process is performed such that, for example, the centers of the thumbnail image and the main image are matched to each other, and the upper and lower parts or the left and right parts of the thumbnail image are cut off so that it has the same aspect ratio as the main image.

(3) The clipping process method is determined from the information on the type of a digital camera 101 used for the imaging, and the clipping process is performed. For example, in the case where the aspect ratios of a thumbnail image and a main image are different, there can be some cases where the centers of the thumbnail image and the main image are also different. In such cases, the actually imaged data position in the whole of the thumbnail image is determined from the information on the type of the above described digital camera 101, and the clipping process is performed.

As described above in detail, according to the output control method and apparatus of the present invention, the aspect ratios of a thumbnail image and a main image of image data are compared, and when they are the same, the thumbnail image is used as the display data, and when they are different, the main image is used as the display data, and consequently, an image faithful to the main image can be displayed.

Furthermore, according to the output control method and apparatus of the present invention, the aspect ratios of a thumbnail image and a main image of image data are compared, and when they are the same, the thumbnail image is used as the display data, and when they are different, the thumbnail image is cut off to have the aspect ratio of the main image and is used as the display data, and consequently, an image faithful to the main image can be displayed.

Furthermore, when the above described thumbnail image is cut off to have the aspect ratio of the main image, the information on the type of the image pick up means is obtained, so that a position where the thumbnail image is cut off may be determined, and consequently, an effective image in the thumbnail image can surely be displayed.

Furthermore, according to the storage medium of the present invention, the above described output control apparatus of the present invention can smoothly be controlled.

What is claimed is:

1. An output control method for controlling output of image data imaged by image input means, comprising:

a display control step of displaying said image data on display means, wherein the display control step compares aspect ratios between a thumbnail image and a main image in said image data, and performs control in accordance with a comparison result so that said thumbnail image is used as display data to be displayed on said display means in a case that the aspect ratios are the same and said main image is used as said display data in a case that the aspect ratios are different.

2. The output control method according to claim 1, wherein said image input means utilizes a digital camera.

3. The output control method according to claim 1, wherein said display means is a Cathode Ray Tube display.

4. The output control method according to claim 1, wherein said display means is a Liquid Crystal Display.

5. The output control method according to claim 1, wherein said display means is a television receiver.

6. An output control apparatus for controlling output of image data imaged by image input means, comprising:

display control means for displaying said image data on display means, wherein the display control means compares aspect ratios between a thumbnail image and a main image in said image data, and performs control in accordance with a comparison result so that said thumbnail image is used as display data to be displayed on said display means in a case that the aspect ratios are the same and said main image is used as said display data in a case that the aspect ratios are different.

7. The output control apparatus according to claim 6, wherein said image input means utilizes a digital camera.

8. The output control apparatus according to claim 6, wherein said display means is a Cathode Ray Tube display.

9. The output control apparatus according to claim 6, wherein said display means is a Liquid Crystal Display.

10. The output control apparatus according to claim 6, wherein said display means is a television receiver.

11. An output control method for controlling output of image data imaged by image input means, comprising:

a display control step of displaying said image data on display means, wherein the display control step compares aspect ratios between a thumbnail image and a main image in said image data, and performs control in accordance with a comparison result so that said thumbnail image is used as display data to be displayed on said display means in a case that the aspect ratios are the same and said thumbnail image is cut off to have the aspect ratio of the main image and used as the display data in a case that the aspect ratios are different.

12. The output control method according to claim 11, wherein centers of said thumbnail image and said main image are matched when said thumbnail image is cut off to have the aspect ratio of said main image.

13. The output control method according to claim 11, wherein said display control step obtains information on types of said image input means and determines a position where said thumbnail image is cut off when said thumbnail image is cut off to have the aspect ratio of said main image.

14. The output control method according to claim 11, wherein said image input means utilizes a digital camera.

15. The output control method according to claim 11, wherein said display means is a Cathode Ray Tube display.

16. The output control method according to claim 11, wherein said display means is a Liquid Crystal Display.

17. The output control method according to claim 11, wherein said display means is a television receiver.

18. An output control apparatus for controlling output of image data imaged by image input means, comprising:

display control means for displaying said image data on display means, wherein the display control means compares aspect ratios between a thumbnail image and a main image in said image data, and performs control in accordance with a comparison result so that said thumbnail image is used as display data to be displayed on said display means in a case that the aspect ratios are the same and said thumbnail image is cut off to have the aspect ratio of said main image and used as said display data in a case that the aspect ratios are different.

19. The output control apparatus according to claim 18, wherein centers of said thumbnail image and said main image are matched when said thumbnail image is cut off to have the aspect ratio of said main image.

20. The output control apparatus according to claim 18, wherein said display control means obtains information on types of said image input means and determines a position where said thumbnail image is cut off when said thumbnail image is cut off to have the aspect ratio of said main image.

21. The output control apparatus according to claim 18, wherein said image input means utilizes a digital camera.

22. The output control apparatus according to claim 18, wherein said display means is a Cathode Ray Tube display.

23. The output control apparatus according to claim 18, wherein said display means is a Liquid Crystal Display.

24. The output control apparatus according to claim 18, wherein said display means is a television receiver.

25. An output control method for controlling output of image data imaged by image input means, comprising:

an image data reading step of reading in the image data;

a display control step of displaying on display means the image data read in in said image data reading step;

a display data forming step of forming display data to be displayed on the display means according to an instruction of said display control step; and a display data outputting step of outputting display data formed in said display data forming step on the display means, wherein said display control step compares aspect ratios between a thumbnail image and a main image in image data read in in said image data reading step, and performs control in accordance with a comparison result so that the thumbnail image is used as display data to be displayed on the display means in a case that the aspect ratios are the same and the main image is used as the display data in a case that the aspect ratios are different.

26. The output control method according to claim 25, wherein the image input means utilizes a digital camera.

27. The output control method according to claim 25, wherein said display means is a Cathode Ray Tube display.

28. The output control method according to claim 25, wherein said display means is a Liquid Crystal Display.

29. The output control method according to claim 25, wherein said display means is a television receiver.

30. An output control apparatus for controlling output of image data imaged by image input means, comprising:

image data reading means for reading in the image data;

display control means for displaying on display means the image data read in by said image data reading means;

display data forming means for forming display data to be displayed on said display means according to an instruction of said display control means; and display data outputting means for outputting display data formed by said display data forming means on said display means, wherein said display control means compares aspect ratios between a thumbnail image and a main image in the image data read in by said image data reading means, and performs control in accordance with a comparison result so that the thumbnail image is used as display data to be displayed on said display means in a case that the aspect ratios are the same and the thumbnail image is cut off to have the aspect ratio of the main image and used as the display data in a case that the aspect ratios are different.

31. The output control apparatus according to claim 30, wherein centers of said thumbnail image and said main image are matched when said thumbnail image is cut off to have the aspect ratio of said main image.

32. The output control apparatus according to claim 30, wherein said display control means obtains information on types of said image input means and determines a position where the thumbnail image is cut off when the thumbnail image is cut off to have the aspect ratio of the main image.

33. The output control apparatus according to claim 30, wherein said image input means utilizes a digital camera.

34. The output control apparatus according to claim 30, wherein said display means is a Cathode Ray Tube display.

35. The output control apparatus according to claim 30, wherein said display means is a Liquid Crystal Display.

36. The output control apparatus according to claim 30, wherein said display means is a television receiver.

37. A storage medium for storing a control program for controlling an output control apparatus that controls output of image data imaged by image input means, which can be read by reading means, wherein the control program comprises a display control module for displaying the image data on display means, and said display control module compares aspect ratios between a thumbnail image and a main image in said image data, and performs control in accordance with a comparison result so that the thumbnail image is used as the display data to be displayed on said display means in a case that the aspect ratios are the same and the main image is used as the display data in a case that the aspect ratios are different.

38. A storage medium for storing a control program for controlling an output control apparatus that controls output of image data imaged by image input means, which can be read by reading means, wherein the control program comprises display control means for displaying the image data on display means, and the display control means compares aspect ratios between a thumbnail image and a main image in the image data, and performs control in accordance with a comparison result so that the thumbnail image is used as the display data to be displayed on the display means in a case that the aspect ratios are the same and the thumbnail image is cut off to have the aspect ratio of the main image and used as the display data in a case that the aspect ratios are different.

39. A storage medium for storing a control program for controlling an output control apparatus that controls output of image data imaged by image input means, wherein the control program comprises:

an image data reading module for reading in the image data;

a display control module for displaying the image data read in by said image data reading module on display means;

a display data forming module for forming display data to be displayed on the display means according to an instruction of said display control module; and a display data outputting module for outputting display data formed by said display data forming module to the display means, wherein said display control module compares aspect ratios between a thumbnail image and a main image in the image data read in by said image data reading module, and performs control in accordance with a comparison result so that the thumbnail image is used the as display data to be displayed on the display means in a case that the aspect ratios are the same and the main image is used as the display data in a case that the aspect ratios are different.

40. A storage medium for storing a control program for controlling an output control apparatus that controls output of image data imaged by image input means, wherein the control program comprises:

an image data reading module for reading in the image data;

a display control module for displaying the image data read in by said image data reading module on display means;

a display data forming module for forming display data to be displayed on the display means according to an instruction of said display control module; and a display data outputting module for outputting display data formed by said display data forming module on the display means, wherein said display control module compares aspect ratios between a thumbnail image and a main image in the image data read in by said image data reading module, and performs control in accordance with a comparison result so that said thumbnail image is used as the display data to be displayed on the display means in a case that the aspect ratios are the same and the thumbnail image is cut off to have the aspect ratio of the main image and used as the display data in a case that the aspect ratios are different.

* * * * *

UNITED STATES PATENT AND TRADEMARK OFFICE
CERTIFICATE OF CORRECTION

PATENT NO. : 6,876,389 B1
DATED : April 5, 2005
INVENTOR(S) : Hideo Honma

It is certified that error appears in the above-identified patent and that said Letters Patent is hereby corrected as shown below:

Column 8,
Line 3, "the as" should read -- as the --.

Signed and Sealed this

Fourth Day of October, 2005

JON W. DUDAS
*Director of the United States Patent and Trademark Office*